United States Patent [19]

Kumbier

[11] Patent Number: 4,871,063
[45] Date of Patent: Oct. 3, 1989

[54] PALLET COVER

[76] Inventor: John F. Kumbier, 30789 Cedar Dr., Burlington, Wis. 53105

[21] Appl. No.: 273,771

[22] Filed: Nov. 21, 1988

[51] Int. Cl.$^4$ ............................................. B65D 19/00
[52] U.S. Cl. .................................... 206/386; 206/597; 206/453
[58] Field of Search .......................... 206/386, 395–600, 206/453; 108/51.1, 51.3, 52.1, 53.1, 53.3, 53.5, 54.1, 55.1, 55.3, 55.5, 56.1, 56.3, 57.1

[56] References Cited

U.S. PATENT DOCUMENTS

| | | | |
|---|---|---|---|
| 3,073,439 | 1/1963 | Symmonds, Jr. ................... | 206/453 |
| 3,140,325 | 7/1964 | Graff . | |
| 3,284,260 | 11/1966 | Best . | |
| 3,300,357 | 1/1967 | Doerfling . | |
| 3,361,610 | 1/1968 | Hannes . | |
| 3,955,677 | 5/1976 | Collingwood . | |
| 4,085,847 | 4/1978 | Jacalone . | |
| 4,118,855 | 10/1978 | Lequeux . | |
| 4,159,887 | 7/1979 | Dick . | |
| 4,184,905 | 1/1980 | Ogata et al. . | |
| 4,241,133 | 12/1980 | Lund et al. . | |
| 4,242,172 | 12/1980 | Fujii . | |
| 4,303,020 | 12/1981 | Houle . | |
| 4,319,530 | 3/1982 | Moog . | |
| 4,391,202 | 7/1983 | Carter et al. . | |
| 4,416,716 | 11/1983 | Ichikawa et al. . | |
| 4,467,004 | 8/1984 | Liebel . | |
| 4,712,687 | 12/1987 | Silcott et al. ........................ | 206/600 |

FOREIGN PATENT DOCUMENTS

| | | | |
|---|---|---|---|
| 536566 | 1/1957 | Canada ............................. | 108/55 R |
| 2051026 | 4/1972 | Fed. Rep. of Germany ...... | 206/597 |

Primary Examiner—William Price
Attorney, Agent, or Firm—Wheeler Law Firm

[57] ABSTRACT

A pallet cover for protecting the upper surfaces of a load resting upon a pallet. The pallet cover is made of multiple layers that are laminated together. There are no staples or like materials used. The pallet cover is a one piece unit comprised of a horizontal upper surface, a bend, and for generally vertical flanges. The flanges are connected to the upper surface at the bend. The flanges are independently flexible along the bend.

9 Claims, 1 Drawing Sheet

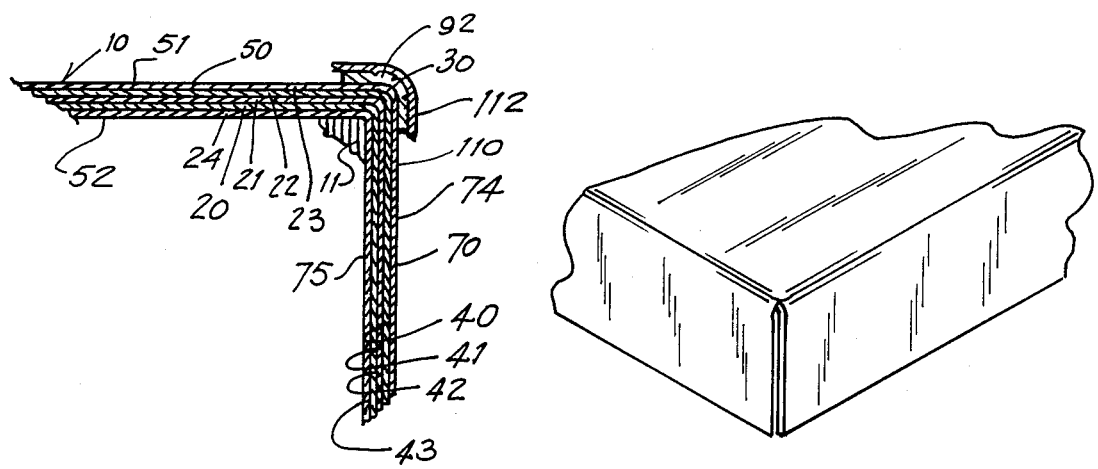
FIG. 1
FIG. 2
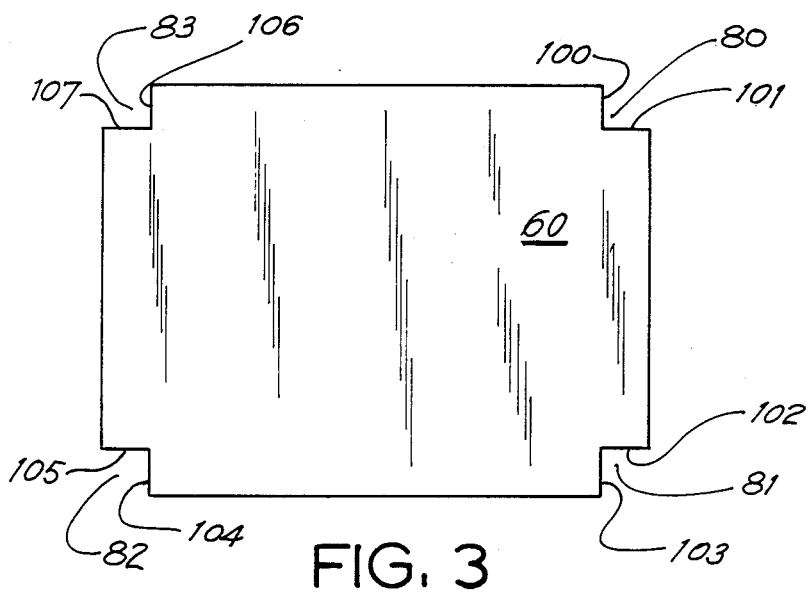
FIG. 3
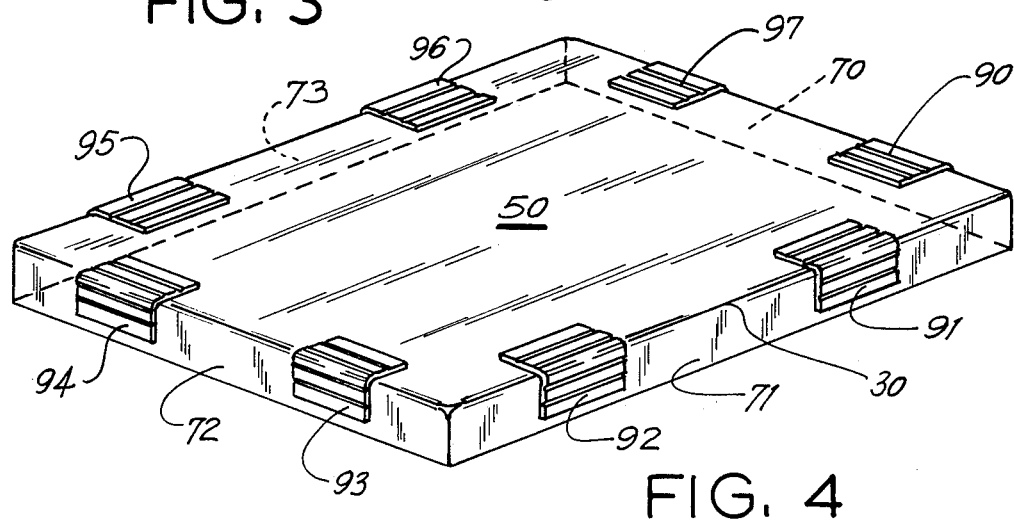
FIG. 4

PALLET COVER

BACKGROUND OF THE INVENTION

The present invention relates to the field of packaging. Specifically it relates to the packaging of commodities on pallets or skids.

Currently many types of commodities are packaged on pallets or skids. In order to protect the top layers of a commodity, such as sheeted paper, from damage caused by stacking, strapping, shipping or bumping a skid top is used.

The typical pallet cover is composed of a flat sheet of wood, masonite, or laminated paper and angle boards made of laminated paper. The skid top is fabricated by cutting the proper size flat piece from a sheet of plywood, masonite, or laminated paper. The angle board is cut to the needed length and then is stapled or glued on all four sides of the flat piece. The completed pallet cover is placed on top of the sheeted paper and banding or strapping is done to complete the packaging process.

This method of building pallet covers requires that a company using such covers maintain an inventory of flat stock, long lengths of angle board, and short lengths of angle board. It requires that a portion of the company's work force be engaged in constructing and assembling the pallet covers. Finally, the finished pallet covers can damage the top layers of sheeted paper due to the wood splinters, staples, and other materials used in their construction.

The present invention is a laminated and molded pallet cover that comprises one single piece. This unique pallet cover is formed of paper board or other substrates and may be shaped to fit the top of any sized pallet. The materials used in constructing this pallet cover are glue and paper board or other substrates. As a result, there are no splinters or staples or other elements which could damage the load on which the pallet cover rests.

Although many references to pallet cover and pallets are known, none are known to the inventor which have or combine the unique features of this pallet cover. For instance, U.S. Pat. No. 4,391,202 (Carter) shows a laminated paper board pallet. In one version the pallet has upturned edges and one of the purposes of the upturned edges is to impart greater strength to the pallet. The patent discusses the grain direction of paperboard, and the fact that it has increased strength in the direction of the grain compared to the direction across the grain, and molding and laminating to form wired structures, but this discussion is directed entirely at corrugated runners which are attached to the bottom of the pallet. Even though the increase in strength resulting from proper grain direction is recognized there is no discussion of increasing the strength of the flat deck of the pallet by alternating grain direction in the laminations of the deck. The use of edge angles to protect goods and strengthen the platform are shown, but, the method of forming the angles at the corners is by scoring or cutting some of the layers so that the edge may be folded in spite of the fact that the alleged purposes include making the pallet stronger. This patent is different from the present invention in several respects. It deals with a pallet rather than a pallet cover. It does not disclose crossed-grain directions for additional strength. It does not disclose molding of the edges for greater strengths than would be provided by the method shown for forming the lip but does disclose molding runners for increased strength. It does disclose the advantage of having the lip and the deck surface in one piece for less fabrication expense but the method adopted does not decrease fabrication expense as much as the method of the present invention.

U.S. Pat. No. 4,319,530 (Moog) shows a pallet having a platform made of corrugated paper board laminations or other sheet material. At the top of column 3 it is indicated that corrugated paper board, fiber board, and thin plywood are all possibilities as well as others. Cross laminating is disclosed in a single sentence. U.S. Pat. No. 4,159,887 (Dick) shows a load cap or top shaped like a box lid but having only 3 of the 4 sides. The side flaps are bent at score lines and are not molded of multiple plies. The material used is laminated plies of liner board made from recycled paper and the like. At the top of column 3 laminating plies of this particular material to achieve the necessary strength and rigidity is discussed. However, the invention is described as not limited to any particular fibrous sheet material or to laminated material. At the middle of the column 3 various characteristics of these materials are discussed but neither fiber directions nor different bending characteristics in different directions are discussed, although at the top of page 4 the inventor indicates awareness that the stiffness is different in the cross grain direction and the direction with the grain. In spite of that disclosure there is no discussion of cross laminating the material nor of any reason for doing so. U.S. Pat. No. 3,955,677 (Collingwood) shows a folded rather than a molded corner with cuts made to permit smooth bending. The material is laminated and the layers are cardboard or paperboard. A reinforcing layer is near the mitered cut line. There does not appear to be any molding step. The description refers only to folding. In U.S. Pat. No. 4,241,133 (Lund), a patent on laminated structures, generally the basic material is chipboard having a grain direction. Lamination and the formation of structures having flat surfaces related at an angle is disclosed but the layers are not formed into such shapes by molding. Rather, they are formed by joining separate flat pieces. In any single flat piece all of the layers or laminations have a grain direction along the same axis rather than having crossed laminations. In U.S. Pat. No. 4,085,847 (Jacalone) a pallet box having a top cover constructed much like any box cover with a top surface and short sides at right angles to the top is disclosed. As disclosed in column 2 at line 30 the top is formed of corrugated paperboard. The central rectangle is divided from the sides by scoring and the flaps are provided to fasten the respective sides to each other. There is no molding and no lamination of the flat plies with different grain directions. U.S. Pat. No. 4,467,004 (Liebel) shows pallet (slipsheet) on which a load of product is piled. At least two sides of the continuous bottom sheet have lips. The main portion of the sheet is a single layer with only the ends being laminated to reinforce the lips. As discussed in column 2 beginning at line 35 and extending through line 50, the narrow reinforcements have grain directions at right angles to one another. At the corners and along the narrow portions of some of the sides you do have laminations with cross grain directions. U.S. Pat. No. 4,414,717 (Ichikawa) shows a method of molding corrugated cardboard with a covering sheet that includes a layer that can melt in the press to bond or laminate the layers. The purpose is to produce a car interior roof lining. The base material is corrugated cardboard and the cover sheet, as disclosed in column 3, may be a laminate of a thin upper sheet and a thick sponge sheet alon with the thermal glue layer. There appears to be no disclosure anywhere in the patent as to the material of the covering sheet and certainly no disclosure that it has or should have a grain direction. U.S. Pat. No. 3,361,610 (Hannes) discloses a method of forming shaped laminates which specifically include fiber layers. There can be more than one such fibrous layer but it is contemplated that they will be glass fiber mats. There is no disclosure that they do or may have a grain direction and the use is for the interior of an automobile which does not appear to require any particular strength. U.S. Pat. No. 4,184,905 (Ogata) shows a method of molding corrugated paperboard. The corrugated paperboard does not have its final form before being molded. There is no discussion of grain direction and because the finished product is intended to be used as insulation; it is not apparent that strength is important. U.S. Pat. No. 3,140,325 (Graff) shows a method of molding several laminations of reinforced plastic materials. The only disclosed reinforcements are glass fibers. There is no discussion of grain direction, the only materials used are plastics, there is no discussion of strength of the materials, and the articles produced appear to be transparent or translucent domes to cover light fixtures. U.S. Pat. No. 3,284,260 (Best) is a patent relating to the making of composite articles such as canoes having a laminating structure. There is no discussion of grain direction but there can be multiple layers of plastic, chipboard, or metal mesh. Molding is employed to reach the final shape. U.S. Pat. No. 3,300,357 (Doerfling) relates to a molded contoured corrugated cardboard panel used as a headliner in an automobile which includes a fabric or other decorative surface. The panel is notched to allow it to be molded without breaking. There is no discussion of grain direction or any differences between the kinds of panels that may be molded so far as strength is concerned. The molding is apparently not very effective to change the shape of the panel since fasteners are placed at the V-shaped slots after they have been closed by molding in order to retain the shape. U.S. Pat. No. 4,118,855 (Lequeux) has essentially nothing to do with lamination but relates to fastening large plates together with a structure that looks a grommet. U.S. Pat. No. 4,242,172 (Fuji) shows a method of transforming corrugated paperboard to a curved form which then becomes the liner for an auto roof interior. As shown in FIGS. 1 and 2 there are multiple layers which may include plastic sheets, artificial leather, woven or non-woven cloth, and laminated materials as well as urethane foam. There is no discussion of strength or of grain direction. All the discussion has to do with smooth molding of the material without wrinkles. U.S. Pat. No. 4,303,020 (Houle) shows a fiberboard pallet which appears to consist of a single folded layer shaped to permit a stiffener to be inserted, with folds formed at soored lines. There is no discussion of lamination or of grain direction.

SUMMARY OF THE INVENTION

The present invention is a pallet cover to be used to protect the upper layers of goods on a pallet from damage. Particularly the protection of upper layers of a commodity such as sheeted paper, from damage is envisioned.

The pallet cover is created by laminating and molding paper, paperboard, or other substrates into a single unit. The pallet cover is then manufactured to the end users specifications covering strength, size, color, water resistance, etc.

The pallet cover is manufactured by taking layers of a material that have a grain, for example paperboard, and placing these layers of paperboard one on top of the other. The grain of each layer of paperboard is at a right angle to the grain of the adjacent layers of paperboard. In between each layer of paperboard an emulsifying adhesive is applied. This adhesive is cured during the manufacturing process. The alternating layers of paperboard and adhesives are placed in a mold and molded to the desired shape. The preferred form has a flat rectangular top with separate independently flexible lips or edges.

After the molding process the resulting pallet cover is one single unit of laminated material comprising a horizontal center portion and four vertical edges. The vertical edges are attached to the horizontal center portion by a bend made during the molding process. The vertical edges are flexible, independently of one another at the bend. Also, the sheets of material, in this case paperboard, from which the finished pallet cover is molded have die cut corners. The effect of these die cut corners is to ensure that no vertical edge is connected to any other vertical edge of the pallet cover. This is what gives the vertical edges their independent flexibility.

Once the pallet cover has been molded plastic shields are, preferably, glued over the bend where the vertical edge and the horizontal center portion meet. These plastic shields provide extra strength to prevent the banding or strapping that is used to secure the pallet cover over the load and to the pallet from cutting through or into the goods under the pallet cover. Makes the pallet cover last longer and further protects the top portion of the load upon which the pallet cover is placed.

The pallet cover is placed over the top of a load. Because it is molded the pallet cover may be manufactured to any specification desired. This allows the fit of the pallet cover over the load to be controlled and made to exact specifications. Also, the cross grain lamination of the pallet cover gives it great strength. In particular, the fact that it is one single molded part piece enhances its strength. Also, the fact that it is free of staples or wood splinters or chips means that it will not damage the surface of the load it is designed to protect.

These and other benefits of the present invention will become apparent from the following detailed detailed description thereof taken in conjunction with accompanying drawings.

DESCRIPTION OF THE DRAWINGS

FIG. 1 is a cut-away view of the side of the pallet cover showing the different layers of materials.

FIG. 2 is a perspective view showing a corner of the pallet cover.

FIG. 3 is a top plan view of the base sheet.

FIG. 4 is a perspective view of the pallet cover.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Referring to FIG. 1 a portion of the pallet cover 10 may be seen. The pallet cover 10 comprises 5 layers of paper board plies 20-24. Between each layer of paper plies 20-24 is a layer of emulsifying adhesives 40-43. The pallet cover 10 is further comprised of a bend 30, a horizontal surface 50, four generally vertical flanges edges 70-73, and eight plastic shields 90-97; also referring to FIG. 4.

Referring to FIG. 3, a base sheet 60 may be seen. The base sheet 60 is made of paper board and is generally rectangular in shape. The base sheet 60 has four die cut corners 80-83. Each die cut corner 80-83 is defined by edges 100-107. Each edge 100-107 is generally the same length as every other edge 100-107. Still referring to FIG. 3, each base sheet 60 may be seen to have a grain 110. The grain has a specific direction. The base sheet 60 is glued to other base sheets by using the emulsifying adhesives 40-43. This forms the plies 20-24 of the cover 10. As each base sheet 60 is glued to another base sheet 60 the direction of the grain is rotated 90 degrees so that the grain of each ply 20-24 will cut across the grain of every other ply 20-24 at a right angle. This greatly increases the strength of the pallet cover.

After all the layers of the base sheets 60 have been stacked together the resulting multi-layer base sheet 60 is molded. The molding process cures the adhesives 40-43 and creates the shape of the pallet cover 10; producing a structure having a flexible bend 30, a generally horizontal surface 50, and four generally vertical flanges 70-73.

Because the base sheet 60 had die cut corners 80-83, the generally vertical flanges 70-73 are connected to the horizontal surface 50 only at the flexible bend 30 of the cover 10; i.e., no one vertical flange 70-73 is connected to any other vertical flange 70-73. As a result, each vertical flange 70-73 is slightly flexible and will flex independently of every other vertical flange 70-73 at the bend 30.

The horizontal surface 50 has a top side 51 and a bottom side 52. The vertical flange 70-73 are not exactly perpendicular to the horizontal surface 50. The flange 70-73 form an obtuse angle to the bottom side 52 of the horizontal surface 50. Alternatively, the position of the flanges 70-73 may be described as not truly perpendicular to the horizontal surface 50. Instead, they are slightly flared out from a true perpendicular position away from the bottom side 52 of the horizontal surfece 50.

Each vertical flange 70-73 has an outside surface 74 and an inside surface 75. The flaring of the flange 70-73 causes the inside surface 75 to act as a ramp that guides the pallet cover 10 over the top surface of the load 11 that rests on the pallet 12. This allows the pallet cover 10 to be easily placed on top of the load 11 and easily moved into proper position for strapping.

Referring to FIG. 1 a cutaway view of the pallet cover 10 may be seen. In particular, it may be seen that a plastic shield 90 covers a portion of the surface of the vertical flange 70, the flexible bend 30, and the horizontal surface 50. Referring to FIG. 4, there are eight plastic shields that are attached to the pallet cover in the above described manner. The plastic shields 90-97 are positioned along the flexible bend 30 so that they will engage the pallet straps 112; thereby protecting the surface of the pallet cover from unnecessary wear. This allows the pallet cover 10 to be used again and again rather than using a new pallet cover every time a load has to be shipped or stacked. The strapping pulls the edges against the load.

The above described embodiments of this invention are merely descriptive of the principles of the invention and are not to be limited. The scope of this invention instead shall be determined from the scope of the following claims, including their equivalents.

What is claimed is:

1. A cover for a load supported by a pallet comprising; a plurality of formed layers of said material means;
   adhesive means;
   said layers of said material means alternating with layers of said adhesive means;
   said alternating layers forming a shape;
   said shape having a generally horizontal upper surface and a plurality of independent integral flanges, each attached to said upper surface along a single bend line;
   each said layer of said material means has a grain;
   said grain having a direction;
   said direction of said grain of each said layer of said material means having a direction different from each adjacent said layer of said material means;
   whereby the strength of said cover is improved.

2. The device of claim 1 in which said bend is covered by protective means.

3. The device of claim 2 in which said protective means are attached to said bend by adhesive means.

4. The device of claim 2 in which the said protective means are hard plastic shields.

5. The device of claim 3 in which said adhesive means is a glue.

6. The device of claim 1 in which the material means is paper board.

7. The device of claim 1 in which the adhesive means are emulsifying adhesives.

8. The device of claim 1 in which each said independent integral flange is attached to said upper surface along a single bend line at an angle greater than 90°.

9. The device of claim 1 in which said cover comprises; a laminated composition of formed paperboard;
   each said layer of said formed paperboard alternating with a layer of emulsifying adhesive;
   said layers of said paperboard and said adhesives being molded to form said cover;
   said cover forming a generally horizontal upper surface and four independent integral flanges, each attached to said horizontal surface along a single bend line at an angle greater than 90°;
   each said layer of said paperboard having a grain;
   said grain having a direction;
   said direction of said grain being at a right angle to said grain of each adjacent layer of said paperboard;
   said bend being covered at spaced intervals by plastic shields;
   said plastic shields being attached to said bend by glue;
   whereby the cover may be secured to the top of a load by means of pallet straps without said straps damaging said top of said load.

* * * * *

UNITED STATES PATENT AND TRADEMARK OFFICE
CERTIFICATE OF CORRECTION

PATENT NO. : 4,871,063

DATED : 3 October 1989

INVENTOR(S) : JOHN F. KUMBIER

It is certified that error appears in the above—identified patent and that said Letters Patent is hereby corrected as shown below:

In claim 1

Column 6, line 13, delete [said] between the word "of" and the word "material".

Signed and Sealed this

Twelfth Day of March, 1991

Attest:

HARRY F. MANBECK, JR.

*Attesting Officer*     *Commissioner of Patents and Trademarks*